April 26, 1966     M. BOBO ETAL     3,248,081
AXIAL LOCATING MEANS FOR AIRFOILS
Filed Dec. 29, 1964     2 Sheets-Sheet 1
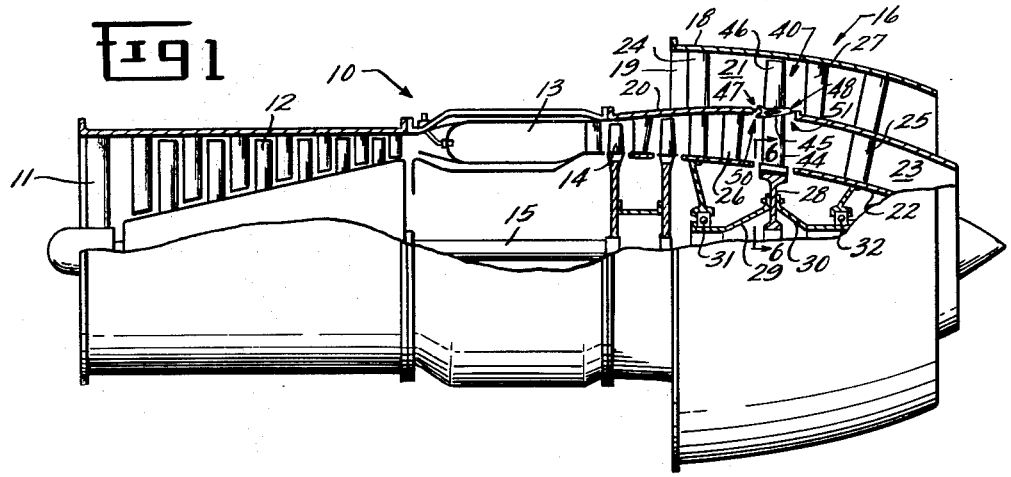
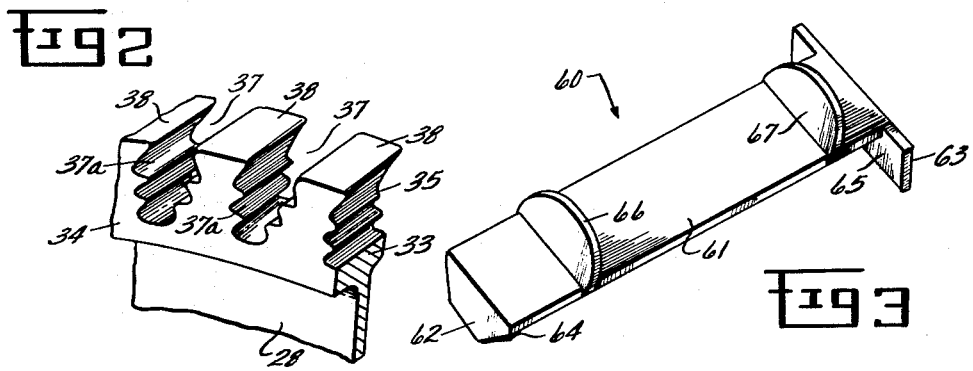
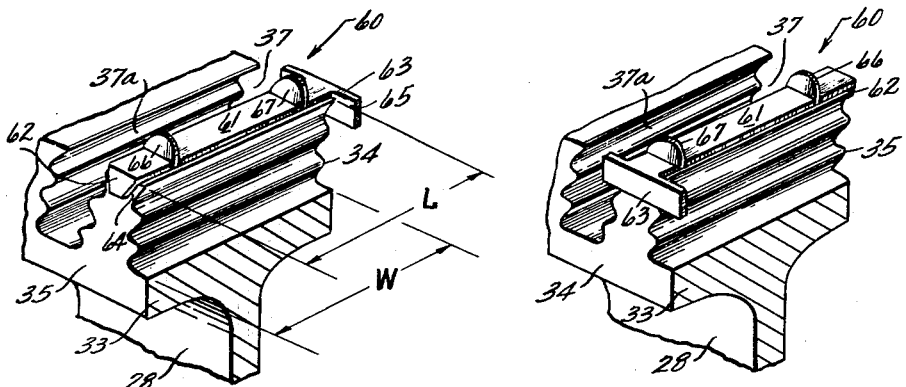
INVENTORS.
MELVIN BOBO
ROBERT J. SMULAND
BY
ATTORNEY

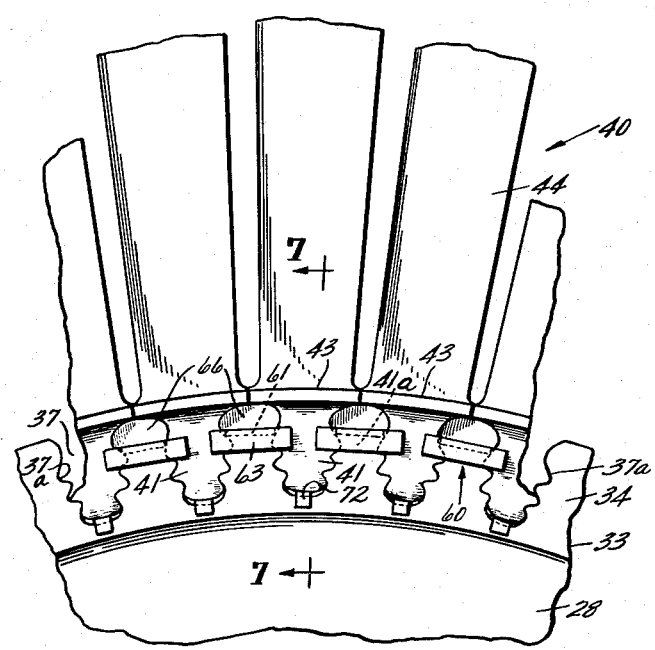
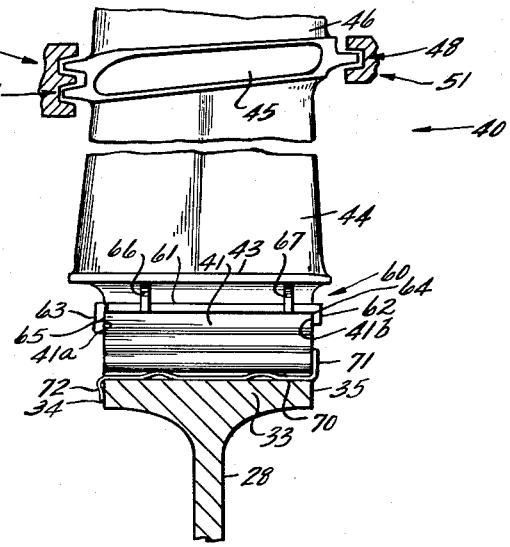

United States Patent Office 3,248,081
Patented Apr. 26, 1966

3,248,081
AXIAL LOCATING MEANS FOR AIRFOILS
Melvin Bobo, Topsfield, and Robert John Smuland, Reading, Mass., assignors to General Electric Company, a corporation of New York
Filed Dec. 29, 1964, Ser. No. 421,854
8 Claims. (Cl. 253—77)

This invention relates to turbomachine rotor assemblies and, more particularly, to improved means for axially locating the airfoil members relative to the associated turbomachine structure. This invention further relates to multiple function means which not only locates the airfoil members, but also provides both airfoil damping and sealing against axial leakage between the bases of adjacent airfoil members.

In bypass gas turbine engines and especially in aft-fan engines, there is a tendency for radial leakage to occur from the inner stream of high pressure, high temperature combustion products outwardly to the concentric outer stream of relatively low pressure, low temperature bypass air at the point where the rotor spans the concentric passageways. The performance, including output thrust and efficiency, of the engine will be noticeably reduced in the event that this leakage is permitted to reach a substantial level. It is therefore desirable to provide effective sealing means for preventing or substantially reducing this radial leakage. In order to reduce this undesired leakage, seals of the labyrinth type have been used in the past. These seals, which typically require close-running axial clearances in order to accomplish satisfactory sealing, have not always performed in an entirely satisfactory manner. While there are a number of factors which can contribute to unsatisfactory sealing performance, it has been found in practice that improper axial alignment of the elements in the fan rotor, including the rotating portion of the seal, is a significant factor. More particularly, the labyrinth seal is typically comprised of one portion supported by the stationary turbomachine structure and another portion, usually seal teeth, carried by the airfoil members. If these airfoil members are not accurately and uniformly positioned relative to the rotor disc and to each other, it is unlikely that the seal will have the small axial clearances generally required for satisfactory sealing. In addition, inaccurate and nonuniform axial alignment of the airfoil members can adversely affect rotor balance during turbomachine operation.

To provide the accurate axial alignment required for effective sealing and rotor balancing, various approaches have been utilized in the past. Common approaches have been to use extremely accurate assembly techniques when assembling the rotor, the result being excessive time consumption and expense. Other approaches have utilized locking keys and similar devices for locating the bases of the airfoils accurately with respect to the rotor disc. Again, the typical result has been added expense and time consumption since unusual airfoil base configurations or special machining are usually required. Furthermore, these approaches sometimes necessitate the use of airfoils having different base configurations in the same assembly.

It is therefore an object of this invention to provide improved locating means for axially positioning the airfoil members in a rotor assembly relative to the rotor disc.

Another object of this invention is to provide means for axially locating the airfoils in relatively precise positions with respect to the rotor disc without requiring the adoption of excessively expensive and time consuming assembly techniques.

A further object is to provide locating means which do not require unusual airfoil base configurations or special machining.

It is a still further object of the present invention to provide multiple function means which not only accomplishes the objects stated above, but also prevents axial leakage through the spaces between adjacent airfoil bases and provide airfoil vibration damping during turbomachine operation.

Briefly stated, in carrying out the invention in one form, a plurality of locating members are associated with respective ones of a plurality of airfoil-base receiving slots circumferentially spaced about the periphery of a rotor disc. Each of the locating members extends axially between the upstream and downstream faces of the rotor disc and has radial projections which engage the opposite faces of the rotor disc to position the locating member in a fixed axial position. The plurality of radial projections engaging one of the disc faces extend across the ends of the associated slots to provide accurately located radial surfaces against which the airfoil bases may be held in abutting relationship by suitable locking means. In this manner, the airfoil bases and, consequently, the airfoils are positioned in relatively precise axial locations with respect to the rotor disc and the stationary turbomachine structure including the stationary seal components.

In accordance with further aspects of the invention, the outer periphery of the rotor disc rim intermediate the slots forms a plurality of lands upon which the axially extending locating members are positioned. The locating members, which are thus positioned in circumferential spaces between the bases of adjacent airfoil members, have baffle means thereon intermediate the radial end projections. These baffles are shaped to interfit with the airfoil base and platform surfaces to seal against axial leakage through the spaces and to provide vibration damping.

While the invention is distinctly claimed and particularly pointed out in the claims appended hereto, the invention will be better understood and appreciated, along with other objects, advantages, and features thereof, from the following detailed description when considered in connection with the accompanying drawing, in which:

FIG. 1 is a sectional view of an aft-fan gas turbine engine utilizing the present invention;

FIG. 2 is a fragmentary perspective view of the rim of the fan rotor disc of FIG. 1 illustrating a plurality of circumferentially spaced slots therein and a plurality of lands formed between adjacent slots;

FIG. 3 is a perspective view of a locating member formed in accordance with the present invention;

FIG. 4 is a view similar to FIG. 2 showing a locating member positioned over one of the lands and engaging opposite faces of the rotor disc;

FIG. 5 is a view similar to FIG. 4 showing the opposite face of the rotor disc;

FIG. 6 is a view taken along line 6—6 of FIG. 1 illustrating the assembled relationship between the rotor disc, the locating members, and the airfoil members; and FIG. 7 is a cross-sectional view taken along line 7—7 of FIG. 6 showing the locking arrangement for holding the airfoil base in the slot and in abutment with the locating members.

The present invention is particularly suited for accurately locating the dual airfoils of a bypass engine so as to provide the precise axial seal alignment normally required for effective radial sealing between the concentric flow passages. Accordingly, an aft-fan engine 10 utilizing the invention is illustrated by FIG. 1, and the invention is described in that context. As this specification proceeds, however, it will become obvious that the axial locating means of this invention can be widely utilized in turbomachinery for providing accurate axial alignment between airfoil members and their supporting structure. Turning now to the illustrated embodiment of the invention and to FIG. 1 in particular, the aft-fan bypass engine 10 includes a gas generator comprised of an inlet 11, an axial flow compressor 12, a combustor 13, and a gas generator turbine 14. The gas generator turbine 14 is driven by combustion products discharged from the combustor 13, and the turbine 14 in turn drives the compressor 12 through a shaft 15. A turbo augmenter 16, or aft fan, is mounted axially downstream of the gas generator and comprises a power turbine and a fan in a single rotor assembly. As shown, the static structure of the turbo augmenter 16 includes a cylindrical outer casing or wall 18 which encloses the entire assemblage and provides an inlet 19 for bypass or secondary air, a cylindrical intermediate wall 20 divided into fore and aft sections and separating the bypass air passage 21 from the turbine exhaust gases, and a cylindrical inner wall 22 formed in two sections which defines the inner boundary of the turbine exhaust passage 23. The three walls are connected by radial struts 24 and 25 and by vanes 26 and 27 which serve as turbine nozzle and fan outlet guide vanes, respectively.

As shown by FIGS. 1 and 2, the rotating structure of the turbo augmenter 16 comprises a single stage rotor which includes a rotor disc 28 connected to fore and aft stub shafts 29 and 30 supported in bearings 31 and 32, respectively. The bearings are in turn attached to the sections of the inner wall and are thus carried by the stationary structure of the augmenter. The rotor disc 28 has a peripheral rim 33 thereon, the rim 33 having upstream and downstream faces 34 and 35, respectively. These faces 34 and 35 of the rim 33 are accurately finished such that they form flat surfaces precisely located with respect to the rotor disc 28 and, since the rotor disc is accurately positioned axially by the bearings 31 and 32, with respect to the stationary structure of the augmenter 16. A plurality of axially extending slots 37 are circumferentially spaced about the outer periphery of the rim, the slots 37 having a dovetail configuration defined by the slot walls 37a. As best illustrated by FIG. 2, the outer peripheral surface of the rim 33 forms a plurality of lands 38 between adjacent ones of the slots 37.

With attention now being directed to FIGS. 1, 6 and 7, a plurality of dual airfoil members 40 are mounted in circumferentially spaced relationship about the periphery of the rotor disc rim 33, each of the dual airfoil members 40 including a dovetail-shaped base 41 which are axially inserted into a respective one of the slots 37. The precise manner in which the bases 41 are received in the slots 37 will be described in detail presently. Each of the dual airfoil members 40 includes in radially disposed relationship the base 41, a circumferentially extending inner platform 43, a turbine bucket 44, a circumferentially extending outer platform 45, and a compressor blade 46. If the rotor assembly is viewed as an integral structure rather than merely as a rotor disc and a group of dual airfoils, it can be described as comprising a rotor disc 28 having a plurality of airfoil members 40 mounted thereon which form an inner segmented ring 43, a row of turbine buckets 44 peripherally mounted thereon and extending radially outward across the turbine exhaust passage 23, a second segmented ring 45 mounted on the outer tips of the turbine buckets, and a row of compressor blades 46 peripherally mounted on the ring 45 and extending radially outward across the bypass air passageway 21. The leading and trailing edges of the outer platforms 45 are serrated such that circumferentially continuous teeth indicated generally by numerals 47 and 48, respectively, are formed when the members 40 are in their assembled relationship. These seal teeth 47 and 48 mate or cooperate with fixed sealing members indicated generally by numerals 50 and 51, respectively, carried by the cylindrical sections of the intermediate wall 20 to prevent radial leakage of gases from one passageway into the other. In order to prevent this radial leakage, it is desirable that the axial clearances between the seal teeth and the fixed sealing members be as small as possible. To accomplish this, it is essential that the dual airfoil members 40 be accurately positioned with respect to the stationary powerplant structure, especially the fixed sealing members. It is also essential that the dual airfoils be accurately aligned with respect to each other so that their serrated edges form smooth continuous seal teeth 47 and 48 not having interruptions therein.

With particular reference to FIG. 6, it will be noted that the spacing between adjacent airfoil bases 41 is such that spaces are formed between the bases inwardly of the inner platforms 43 and outwardly of the lands 38 between the slots 37. Unless prevented by a suitable baffle arrangement, the hot gases in the exhaust passage 23 will tend to bypass the turbine buckets 44 by flowing through these spaces. Such a situation is, of course, undesirable since the energy in the gases is thus dissipated without producing work.

The present invention resides in novel means for accurately locating the dual airfoil members 40 relative to the stationary powerplant structure and to each other. In addition to providing the required axial alignment, the locating means of this invention both effectively seals the spaces between adjacent bases 41 to prevent axial leakage therethrough and provides vibration damping for the turbo augmenter rotor. As shown by FIG. 3, the axial locator 60 of this invention comprises an elongated body portion 61 having projections 62 and 63 at opposite ends thereof, the projections being generally perpendicular to the longitudinal axis of the body 61. As best illustrated by FIG. 7, the body portion 61 and the end projections 62 and 63 form in longitudinal section a "channel" configuration. Turning attention now to FIGS. 3–5, the body portion 61 has a length L between the end projections 62 and 63 which is substantially the same as the width W of the rotor disc rim 33 between its upstream and downstream faces 34 and 35, respectively.

The surfaces 65 and 64 of the end projections 63 and 62, respectively, are, as the rim faces 34 and 35, accurately finished so that the axial locator 60 can be slipped radially over the disc rim with very little axial clearance between mating surfaces of the rim and the axial locator. It will be noted that the projection 63 is significantly larger than projection 62; the reason for this will become apparent as this description proceeds. It will also be noted that two intermediate projections or baffles 66 and 67 are located on the body portion 61 intermediate its ends, these projections also being generally perpendicular to the body portion 61 and projecting therefrom in a direction opposite to that of the end projections 62 and 63.

To locate the dual airfoil members 40 axially with respect to the rotor disc 28, the fixed sealing members 50 and 51, and each other, the axial locators 60 are slipped radially over the disc rim 33 before the bases 41 are inserted into the slots 37. More particularly, as shown by FIGS. 4 and 5, a locator 60 is radially inserted over the land 38 between each pair of adjacent slots 37, the surface 64 of the smaller projection 62 being in contact with the downstream face 35 of the rim 33 and the surface 65 of the larger projection 63 being in contact with the upstream face 34. The larger projection 63 extends circumferentially over the upstream ends of the adjacent slots 37 such that the surface 65 provides an accurately located abutment surface blocking the slots 37. With the axial locator 60 positioned over the land 38, the dual airfoil bases 41 may be axially inserted from the downstream side of the rotor disc rim into the slots 37 until their upstream ends 41a contact the surface 65 of the axial locator 60 as best illustrated by FIG. 6. With the rotor disc 28 being precisely positioned relative the stationary structure, particularly the fixed sealing means 50 and 51, the disc faces 34 and 35 being accurately positioned relative to the disc 28, and the base surfaces 41a being accurately located with respect to the serrated teeth 47 and 48 of the outer platforms 45, the axial locator 60 of this invention can provide the precise axial positioning of the dual airfoil members 40 necessary for effective sealing between the seal teeth 47 and 48 and the fixed sealing means 50 and 51. It will also be noted that the intermediate projections 66 and 67 are shaped to interfit closely with the bases 41 and the under surface of the inner platform 43, there being just sufficient clearance to permit insertion of the bases 41 into the slots 37 when the axial locator 60 is in position. When the turbine augmenter rotor is in operation, however, centrifugal force causes the axial locators 60 to move radially outward until the clearance between the baffles or projections 66 and 67 and the inner platform 43 is substantially closed. In this manner, axial leakage between the bases 41 is prevented. This rubbing contact between the locator 60, the bases 41 and the inner platform 43 also provides a substantial amount of vibration damping during operation.

As discussed above, the upstream projection 63 of the locator 60 provides an accurately located surface 65 against which the upstream ends of the bases 41a of the dual airfoil members 40 can abut. During operation of the turbo augmenter 16, the net thrust exerted on the dual airfoils 40 by the exhaust products flowing through the inner passageway 23 and the bypass air flowing through the outer passageway 21 forces the base ends 41a against the surface 65, the axial thrust being, of course, transmitted through the body portion 61 to the downstream projection 62 and from there to the downstream face 35 of the disc rim 33. The dual airfoil members 40 are thus held in a fixed axial position by the axial locator 60 during turbomachine operation. Since the bases 41 can be inserted into the slots 37 and removed without any requirement that the locator 60 be deformed or modified in any manner, it will be obvious that the locator 60 can be reused.

As illustrated by FIGS. 6 and 7, the bases 41 are held in the slots 37 by means of locking strips 70. After the bases 41 are inserted in the manner described above, each strip 70 is inserted from the downstream end of the respective slot 37 and is pulled through the slot 37 until the outwardly turned end 71 engages the downstream end 41b of the base 41 and forces the upstream end 41a of the base 41 into contact with surface 65. The end 72 of the strip 70 is then bent inwardly against the upstream face 34 of the rim 33 to hold the airfoil member in position. The locking strip 70 thus holds the base 41 in the slot 37 when the turbo augmenter 16 is not operating; it can be extremely lightweight since it is not called upon to carry any thrust loads.

It will thus be seen that the improved locating means of the present invention provides accurate location of the airfoil members and the circumferential seal teeth relative to the rotor disc and the stationary structure without requiring either excessively expensive and time consuming assembly technique or unusual component configurations. The locating means also prevents undesired axial leakage between adjacent airfoil and excessive vibration during turbomachine operation.

It will be understood that the invention is not limited to the specific details of the construction and arrangement of the particular embodiment illustrated and described herein. It is therefore intended to cover in the appended claims all such changes and modifications which may occur to those skilled in the art without departing from the true spirit and scope of the invention.

What is claimed as new and desired to secure by Letters Patent of the United States is:

1. In an aft-fan gas turbine engine, a rotor assembly comprising:
   a rotor disc having an upstream face and a downstream face and a plurality of circumferentially spaced axial dovetail slots in the rim thereof,
   the outer periphery of said rotor disc rim intermediate said plurality of dovetail slots forming a plurality of lands,
   a plurality of airfoil members having dovetail bases received in respective ones of said slots and extending radially outwardly therefrom,
   said plurality of airfoil members cooperating to form a first segmented ring surrounding said rotor disc rim in radially spaced relationship thereto, a row of airfoil shaped turbine buckets peripherally mounted on said first ring, a second segmented ring mounted on the outer tips of said turbine buckets, and a row of airfoil shaped compressor vanes peripherally mounted on said second ring,
   a plurality of rigid locating members,
   each of said locating members positioned on a respective one of said lands inwardly of said first ring and extending axially between the upstream and downstream faces of said rotor disc and having at opposite ends thereof radial projections engaging the upstream and downstream disc faces to position said locating member in a fixed axial position,
   the radial projections engaging the upstream face of said disc extending across the ends of the adjacent slots to provide radial surfaces against which said airfoil bases may abut, said radial surfaces being accurately located axially with respect to the disc faces, the downstream ends of said slots being unobstructed by the radial projections engaging the downstream face of said disc to permit insertion and removal of said airfoil bases from the downstream ends of said slots,
   and a plurality of locking strips each received in a respective one of said slots, said strips adapted to be deformed to hold said bases in abutment with the radial surfaces on the projections extending across the upstream ends of said slots to locate said airfoil members in fixed axial positions.

2. A turbomachine rotor assembly comprising:
   a rotor disc having an upstream face and a downstream face and a plurality of circumferentially spaced axial slots in the rim thereof,
   a plurality of airfoil members having bases received in respective ones of said slots and extending radially outward therefrom,
   a plurality of rigid locating members associated with respective ones of said slots,
   each of said locating members extending axially between the upstream and downstream faces of said disc and having radial projections engaging the upstream and downstream disc faces to position said locating member in a fixed axial position,
   the radial projections engaging a first one of said disc faces extending across first ends of the associated slots to provide radial surfaces against which said airfoil bases may abut, said radial surfaces being accurately located axially with respect to the disc faces, the second ends of said slots being unobstructed by the radial projections engaging the second of said disc faces to permit insertion and removal of said airfoil bases from the second ends of said slots,
   and locking means engaging said airfoil bases to hold said bases in abutment with the radial surfaces on the projections extending across the first ends of said slots to locate said airfoil members in fixed axial positions.

3. A turbomachine rotor assembly comprising:
   a rotor disc having an upstream face and a downstream face and a plurality of circumferentially spaced axial slots in the rim thereof,
   the outer periphery of said rotor disc rim intermediate said plurality of slots forming a plurality of lands,
   a plurality of airfoil members having bases received in respective ones of said slots and extending radially outward therefrom, a plurality of rigid locating members, each of said locating members positioned on a respective one of said lands and extending axially between the upstream and downstream faces of said disc and having radial projections engaging the upstream and downstream disc faces to position said locating member in a fixed axial position, the radial projections engaging a first one of said disc faces extending across first ends of the adjacent slots to provide radial surfaces against which said airfoil bases may abut, said radial surfaces being accurately located axially with respect to the disc faces, the second ends of said slots being unobstructed by the radial projections engaging the second of said disc faces to permit insertion and removal of said airfoil bases from the second ends of said slots, and locking means engaging said airfoil bases to hold said bases in abutment with the radial surfaces on the projections extending across the first ends of said slots to locate said airfoil members in fixed axial positions.

4. A turbomachine rotor assembly comprising:

a rotor disc having an upstream face and a downstream face and a plurality of circumferentially spaced axial dovetail slots in the rim thereof, the outer periphery of said rotor disc rim intermediate said plurality of dovetail slots forming a plurality of lands, a plurality of airfoil members having dovetail bases received in respective ones of said dovetail slots and extending radially outward therefrom, said airfoil members having circumferentially extending platforms forming a segmented ring surrounding said rotor disc rim in radially spaced relationship thereto, a plurality of rigid locating members, each of said locating members positioned on a respective one of said lands inwardly of said ring and extending axially between the upstream and downstream faces of said rotor disc and having at opposite ends thereof radial projections engaging the upstream and downstream disc faces to position said locating member in a fixed axial position, the radial projections engaging a first one of said disc faces extending across first ends of the adjacent slots to provide radial surfaces against which said airfoil bases may abut, said radial surfaces being accurately located axially with respect to the disc faces, the second ends of said slots being unobstructed by the radial projections engaging the second of said disc faces to permit insertion and removal of said airfoil bases from the second ends of said slots, and a plurality of locking strips each received in a respective one of said slots, said strips adapted to be deformed to hold said bases in abutment with the radial surfaces on the projections extending across the first ends of said slots to locate said airfoil members in fixed axial positions.

5. A rigid locating member for use in a turbomachine rotor assembly including a rotor disc having circumferentially spaced slots in the rim thereof and radial airfoil members having bases received in the slots, said locating member comprising:

an elongated body portion for extending axially across the rotor disc at the rim thereof intermediate a pair of adjacent slots, and first and second projections at the respective ends of said body portion non-deformably formed therewith, said projections being perpendicular to the axis of said body portion, said first projection having a first accurately finished surface thereon for engaging a first face of said rotor disc and for extending across the ends of said slots so as to provide a surface against which the airfoil bases in said slots may abut, said surface being located in a plane perpendicular to the axis of said body portion, said second projection having a second accurately finished surface thereon for engaging only the second face of said rotor disc to permit unobstructed access to said slots from the second face of said rotor disc, the distance between the first and second accurately finished surfaces being sufficient to permit said body portion to be placed across the rotor disc intermediate a pair of adjacent slots with very little axial clearance between the rotor disc faces and said surfaces, whereby said locating member may be used to accurately locate airfoil members relative to the rotor disc.

6. A locating member as defined by claim 5 in which said member has baffle means thereon intermediate said first and second projections, said baffle means being shaped to interfit with selected surfaces of the associated airfoil base so as to provide a seal.

7. In an aft-fan gas turbine engine, a rotor assembly comprising:

a rotor disc having an upstream face and a downstream face and a plurality of circumferentially spaced axial dovetail slots in the rim thereof, the outer periphery of said rotor disc rim intermediate said plurality of dovetail slots forming a plurality of lands, a plurality of airfoil members having dovetail bases received in respective ones of said slots and extending radially outwardly therefrom, said plurality of airfoil members cooperating to form a first segmented ring surrounding said rotor disc rim in radially spaced relationship thereto, a row of airfoil shaped turbine buckets peripherally mounted on said first ring, a second segmented ring mounted on the outer tips of said turbine buckets, and a row of airfoil shaped compressor vanes peripherally mounted on said second ring, a plurality of locating members, each of said locating members positioned on a respective one of said lands inwardly of said first ring and extending axially between the upstream and downstream faces of said rotor disc, said locating member having at opposite ends thereof radial projections engaging the upstream and downstream disc faces to position said locating member in a fixed axial position and having baffle means intermediate said projections, said baffle means being shaped to interfit with the wall surfaces of adjacent airfoil members to provide a seal inwardly of said first ring, the radial projections engaging the upstream face of said disc extending across the ends of the adjacent slots to provide radial surfaces against which said airfoil bases may abut, said radial surfaces being accurately located axially with respect to the disc faces, and a plurality of locking strips each received in a respective one of said slots, said strips adapted to be deformed to hold said bases in abutment with the radial surfaces on the projections extending across the ends of said slots to locate said airfoil members in fixed axial positions.

8. A turbomachine rotor assembly comprising:

a rotor disc having an upstream face and a downstream face and a plurality of circumferentially spaced axial dovetail slots in the rim thereof, the outer periphery of said rotor disc rim intermediate said plurality of dovetail slots forming a plurality of lands, a plurality of airfoil members having dovetail bases received in respective ones of said dovetail slots and extending radially outward therefrom, said airfoil members having circumferentially extending platforms forming a segmented ring surrounding said rotor disc rim in radially spaced relationship thereto, a plurality of locating members, each of said locating members positioned on a respective one of said lands inwardly of said ring and extending axially between the upstream and downstream faces of said rotor disc, said locating member having at opposite ends thereof radial projections engaging the upstream and downstream disc faces to position said locating member in a fixed axial position and having baffle means thereon, said baffle means cooperating with the wall surfaces of the adjacent airfoil members to provide a seal inwardly of said segmented ring, the radial projections engaging a selected one of said disc faces extending across the ends of the adjacent slots to provide radial surfaces against which said airfoil bases may abut, said radial surfaces being accurately located axially with respect to the disc faces, and a plurality of locking strips each received in a respective one of said slots, said strips adapted to be deformed to hold said bases in abutment with the radial surfaces on the projections extending across the ends of said slots to locate said airfoil members in fixed axial positions.

References Cited by the Examiner

UNITED STATES PATENTS

| | | |
|---|---|---|
| 2,618,460 | 11/1952 | Williams. |
| 2,669,383 | 2/1954 | Purvis et al. |
| 2,755,063 | 7/1956 | Wilkinson _____ 253—77 |
| 2,828,942 | 4/1958 | McCullough et al. _____ 253—77 |
| 2,912,223 | 11/1959 | Hull _____ 253—77 |
| 2,999,631 | 6/1961 | Wollmershauser. |
| 3,043,562 | 7/1962 | Van Nest et al. _____ 253—77 |
| 3,045,329 | 7/1962 | Carli et al. |
| 3,057,598 | 10/1962 | Boyle et al. _____ 253—77 |
| 3,076,634 | 2/1963 | Boyle et al. _____ 253—77 |

FOREIGN PATENTS

| | | |
|---|---|---|
| 652,099 | 4/1951 | Great Britain. |
| 691,380 | 5/1953 | Great Britain. |
| 715,837 | 9/1954 | Great Britain. |
| 925,273 | 5/1963 | Great Britain. |

References Cited by the Applicant

UNITED STATES PATENTS 2,942,842    6/1960    Hayes.

FOREIGN PATENTS 671,960    5/1962    Great Britain.

SAMUEL LEVINE, *Primary Examiner.*

E. A. POWELL, JR., *Assistant Examiner.*